United States Patent [19]

Rigge et al.

[11] 3,928,236

[45] Dec. 23, 1975

[54] ALUMINA CATALYST CARRIERS AND THE PROCESS FOR PRODUCING THEM

[75] Inventors: Ronald J. Rigge, Pleasanton; Stephen C. Carniglia, Byron, both of Calif.

[73] Assignee: Kaiser Aluminum & Chemical Corporation, Oakland, Calif.

[22] Filed: Nov. 25, 1974

[21] Appl. No.: 527,093

[52] U.S. Cl.................................. 252/463; 423/631
[51] Int. Cl.².......................................... B01J 21/04
[58] Field of Search..................... 252/463; 423/631

[56] References Cited
UNITED STATES PATENTS
3,112,279  11/1963  Papée et al. .................... 252/463 X

*Primary Examiner*—W. J. Shine
*Attorney, Agent, or Firm*—Paul E. Calrow; Andrew E. Barlay

[57] ABSTRACT

Thermally stable, shaped alumina catalyst carriers are made by treating an alumina shape of predominantly chi-rho-eta or pseudoboehmite crystalline phase structure, or mixtures thereof, with an ammonium salt in an aqueous medium under pressure within the temperature range of about 100°C and 250°C, followed by removal of water-leachable constituents and a subsequent thermal activation step. The products exhibit high thermal stability at elevated temperatures.

11 Claims, No Drawings

ALUMINA CATALYST CARRIERS AND THE PROCESS FOR PRODUCING THEM

BACKGROUND OF THE INVENTION

High temperature catalytic chemical reactions require catalysts which are capable of performing without deterioration in catalytic properties, for extended time periods. If the catalyst loses its activity, a change-out operation has to take place, which is generally time-consuming and results in loss of productivity, as well as costly in respect to replacement of the catalyst. Consequently, the chemical process industry desires such catalysts, which perform without change in activity even at elevated temperatures for significant lengths of time. It has already been found that alumina base catalysts and catalyst carriers possess relatively high stability even when used at moderately high temperatures. Nevertheless, in higher temperature applications, gradual deterioration takes place in the crystalline phase structure of the alumina with corresponding decrease in the physical and chemical properties of the catalyst. In order to reduce this tendency, attempts have already been made to improve the high temperature performance of the alumina base and among the processes employed to increase the high temperature strength of alumina base carriers methods are suggested which involve the treatment of the alumina base with an acidic material under pressure. Thus, for example in U.S. Pat. Nos. 3,480,389 and 3,628,914 processes have been disclosed for the treatment of active alumina, wherein the alumina, generally in pellet form, was impregnated with an acidic material selected from $HCl$, $H_2SO_4$, $H_3PO_4$, $HNO_3$, hydrobromic acid, formic acid, acetic acid, propionic acid and chlorinated or brominated derivatives of acetic and propionic acids. The impregnated pellets were then subjected to a pressure treatment in the presence of steam in an autoclave at temperatures greater than 100°C, generally within the temperature range of 150°–250°C for 1–20 hours. The acid treated pellets were then dried and reactivated to obtain a material which even at elevated temperatures retains its physical strength. These processes, while they produce an improved alumina catalyst carrier, involve the use of strong acids having dissociation constants ($K_a$ values) in excess of $10^{-5}$ i.e., the pH of their aqueous solution being generally less than 4, wherein a chemical reaction takes place with the alumina resulting in partial deterioration of the pellets and in the incorporation of acid residues in the alumina. The use of strong acids and strongly acidic alumina salts also cause processing problems, such as serious corrosion of the equipment involved in the treatment; while the acid salt residues remaining in the treated alumina can interfere with the performance of the catalytic agent subsequently deposited on the treated alumina carrier. To overcome at least the second problem area, that is the effect of residual salts in the alumina, U.S. Pat. Nos. 2,774,744 teaches that after the acid treatment in an autoclave, the treated alumina should be leached with water. The leaching is aimed only at removing soda values, which are known to seriously affect the properties of the alumina; the performance of catalysts based on aluminas containing soda values is known to be inferior in most applications. The treatment described in the latter patent is limited in its nature, since the starting material is gibbsite ($Al_2O_3 \cdot 3H_2O$) of no activity and the alumina, after the acid treatment, although low in soda values, does not exhibit improved physical properties at elevated temperature.

It has now been found that all of the disadvantages presented by the prior art processes can be readily overcome by treating alumina shapes, such as spheres, pellets or extrudates having a predominantly chi-rho-eta or pseudoboehmite crystalline phase structure, or mixtures thereof, with an ammonium salt dissolved in an aqueous medium and having a pH value in aqueous solution of greater than 4, preferably in the range between about 5 and 9, with a subsequent steam pressure treatment, followed by leaching with water to remove water-soluble constituents followed by a subsequent drying and thermal activation step. The resulting active alumina exhibits high physical stability at elevated temperatures for extended periods without losing its strength and without undergoing crystalline phase transformations which significantly affect its activity.

While the exact reasons for the significantly improved properties are not known, it is believed that the treatment within the pH range of 5–9 avoids appreciable dissolution of the alumina and thus prevents weakening of the alumina shapes. In addition, within the pH range utilized by the instant process, formation of considerable quantities of in-situ aluminum salts is avoided which would otherwise on the one hand increase the harmful impurity content of the alumina and on the other hand, due to sorption, reduce the available active sites on the surface of the shapes.

SUMMARY OF THE INVENTION

Thermally stable active alumina shapes are prepared by treating alumina shapes having a predominantly chi-rho-eta or pseudoboehmite crystalline phase structure, or mixtures of these, with an ammonium salt having a pH in an aqueous medium in the range of about 4 to 9, followed by autoclaving of the treated shapes at a temperature within the range of about 100°C to about 250°C for a time period from about 4–36 hours. The autoclaved shapes are then leached with water followed by drying and thermal activation within a temperature range of about 500°–980°C. The produced shapes exhibit a surface area in excess of about 60 $m^2/g$, depending on activation temperature, a crush strength at least about 6 kg, a low cationic and anionic impurity level, an abrasion loss below about 0.1% and a predominantly delta crystalline structure. Upon heating of the treated shapes to 980°C for a period of 24 hours, the shapes retain a significant portion of their strength and surface area, thus rendering them suitable for high temperature use for extended periods.

DETAILED DESCRIPTION OF THE INVENTION

The instant process relates to the preparation of thermally stable active alumina shapes by treating active alumina shapes having a predominantly chi-rho-eta or pseudoboehmite crystalline phase structure, or mixtures thereof, in an aqueous medium with an ammonium salt, having a pH value in an aqueous solution between 4 and 9, followed by a steam pressure treatment and subsequent leaching with water to remove water-soluble constituents. The leached alumina is then dried and thermally activated.

Alumina shapes having a predominantly chi-rho-eta crystalline structure are conveniently made by subjecting alumina trihydrate to rapid dehydration, for example by introducing alumina trihydrate into a high temperature flame, followed by rapid quenching according to the process disclosed in detail in U.S. Pat. No. 3,222,129 (H. E. Osment et al.).

The rapid or flash calcination produces a transitional alumina which is capable of at least partial rehydration. The transitional alumina having a predominantly chi-rho-eta structure is then shaped to any desired configuration, although the shaping step may be preceded by a grinding step to obtain a suitable particle size. Shaping may involve pelletizing, extrusion or any other known method; spherical shapes of predetermined size may be conveniently made by the method disclosed in U.S. Pat. No. 3,226,191 (H. E. Osment et al.). In this patent transitional, at least partially rehydratable alumina is ground, then formed into spheres, followed by a rehydration step, which imparts strength to the formed spheres. The shaping step can be followed by drying and thermal activation at about 350°–450°C. The methods disclosed in the above-referred to references only serve as illustration how the starting material, that is the alumina shapes employed in the instant process, may be prepared. However, any method resulting in the formation of a transitional alumina, having a predominantly chi-rho-eta structure, can be suitably employed for making the alumina starting material utilized in the instant process. Also, any shaping operation, including the ones mentioned above, may be utilized.

For the purposes of this invention the expressions "transitional" and "predominantly chi-rho-eta structure" refer to aluminas containing at least about 50% by weight alumina having a chi-rho-eta crystalline structure as determined by X-ray diffraction.

Alumina of pseudoboehmitic crystalline structure can be made by well-known methods which are described in sufficient detail in the prior art. For example, a suitable process has been described in U.S. Pat. No. 3,630,670 (N. Bell et al.), wherein pseudoboehmitic alumina is made by the reaction of an alkali aluminate solution with a mineral acid solution. The produced alumina has a predominantly pseudoboehmitic structure as determined by X-ray diffraction using copper K$\alpha$ radiation. The diffraction peak of the greatest intensity ($I/Io$) for pseudoboehmite is at 6.5–6.8A and the pseudoboehmite content of the alumina is determined by measuring the area under the 14.5° 2 $\theta$ diffraction peak. Naturally, other methods resulting in the production of pseudoboehmite can be readily employed.

For the purposes of this invention the terms "pseudoboehmitic alumina" or "pseudoboehmite" refer to an alumina, regardless of the manner of its preparation, which contains at least about 25% by weight pseudoboehmite, as determined by X-ray diffraction analysis, in comparison to an essentially pure standard pseudoboehmite exhibiting an X-ray diffraction peak in the 6.5–6.8A range as measured by copper K$\alpha$ radiation at 14.5°, 2$\theta$ angle.

Shaping of the pseudoboehmite can be accomplished by conventional processes such as pelletizing, extrusion or sphere formation. Production of high strength spheres from pseudoboehmite has already been described in U.S. Pat. No. 3,714,313 (Belding et al.) wherein by exercising suitable controls, such as control of particle size, water-content, prior to and during shaping, a highly porous but strong sphere can be made. The spheres thus prepared can be readily employed in the instant process as starting material. Notwithstanding the above, it is to be understood that pseudoboehmite shapes made by any other method are equally suitable for use as the starting material in the present invention, provided the pseudoboehmite used for making the shapes falls within the scope of the above definition.

The alumina shapes, in accordance with the instant process, are treated with an aqueous solution of an ammonium salt. The ammonium salt solutions employed in this process are characterized by a pH value in the range of about 4.0 to 9.0 when in aqueous solution. Suitable ammonium salts employed in the process include the following: ammonium acetate (pH 7), ammonium sulfate (pH 5.5), ammonium bicarbonate or carbonate (pH 7–9), ammonium formate (pH 6.5), ammonium nitrate (pH 6) and ammonium chloride (pH 6) and mixtures thereof.

Treatment with the ammonium salt can be accomplished by immersing the transitional alumina shapes in an aqueous solution of the ammonium salt selected. Generally, the concentration of the aqueous ammonium salt solution is selected to be between about 0.5–7% by weight, calculated on the $NH_4^+$ content of the solution. While lower concentrations may also be employed, it was found that the treatment period with the ammonium salt solution becomes relatively ineffective at $NH_4^+$-ion concentrations less than about 0.5% by weight. Ammonium salt concentrations in excess of about 7% by weight of $NH_4^+$ can also be utilized, however, the rate of impregnation of the active alumina shapes at concentrations in excess of about 7% does not proceed appreciably faster than when a 0.5–7% by weight $NH_4^+$ concentration is employed. Also, higher salt concentrations can tend to incorporate in the active alumina an undesirably high anion content. The time period for keeping the alumina shapes in the aqueous ammonium salt solution is usually selected to be at least 30 minutes. Optimum impregnation is generally obtained within 60–120 minutes. However, longer periods can also be utilized. The impregnated shapes are then drained and the still wet shapes are subsequently placed in an autoclave where the steam pressure treatment of the impregnated active alumina shapes takes place.

Alternatively, instead of using a separate impregnation step, the aqueous ammonium salt solution may be directly placed in the autoclave together with the alumina shapes and then impregnation and pressure treatment are accomplished simultaneously.

Regardless which process is utilized, the pressure treatment is accomplished within a temperature range of about 100°C and 250°C, the range within about 115°C and 200°C being found to provide optimum results.

The time period employed for the pressure treatment varies between 4–36 hours; for best results autoclaving is conducted for 16–36 hours.

Subsequent to the pressure treatment the autoclaved alumina shapes are removed from the autoclave and then leached with water. The leaching process can also be accomplished within the autoclave or in any other convenient manner, for example, by placing the treated shapes on an endless belt equipped with overhead wash water sprays. Leach water, after contact with the active alumina shapes, can be removed by draining, pumping or by applying vacuum on the under-surface of the carrying belt. Another suitable method involves slurrying the autoclaved shapes in water and removing the supernatant impure leach solution by decantation. Other well-known methods involved in the leach-wash treatment of solids can be equally applied for the water leaching of the autoclaved alumina shapes. Leaching is conducted with water and the leach water temperature is generally kept in the range of about 20°–100°C, the temperature range of 50°–98°C being preferred. For best results, particularly when the ammonium salt employed in the treatment is selected from ammonium sulfate, or ammonium chloride, the pH of the leach solution can be adjusted by addition of a suitable base, such as ammonia, to be in the pH range of 8–10.0. At these pH values it can be assured that the residual anion content of the alumina will be reduced to low levels.

Subsequent to leaching, the leached alumina shapes are dried, usually within a temperature of about 100°C and 200°C for a time period sufficient to remove adhered and chemically unbound water. After drying, the alumina shapes are subjected to a thermal activation step.

Thermal activation of the treated alumina shapes can be accomplished as follows. The shapes can be placed in a suitable furnace and then gradually heated to the desired activation temperature allowing sufficient residence time at the final activation temperature. It was found that in order to produce an exceptionally thermally stable active alumina of desired properties, the final activation temperature should be within the range of about 500°C and 980°C, preferably within the range of 850°–950°C. The alumina shapes are, for best results, kept at this temperature for about 30–100 minutes.

It is also possible to activate the alumina shapes in stages, for example, the shapes can be kept up to about 400°C for 1 hour, followed by a second heat treatment up to about 980°C for 1 hour. Activation can also be accomplished continuously in a kiln-like structure where the alumina shapes are countercurrently contacted with hot gases, provided the shapes are kept within the 500°–980°C temperature range for a sufficient length of time assuring the formation of thermally stable active alumina shapes.

The thermally stable active alumina shapes produced according to the process described above exhibit a predominantly delta crystalline structure, when activated within the preferred range indicated above, wherein, as determined by X-ray diffraction measurements, the delta alumina content of the thermally stable active alumina is in excess of about 50% by weight. These thermally stable alumina shapes possess a low cationic and anionic impurity content, generally a cationic impurity content of less than about 0.1% by weight, an anionic impurity level, depending on the anion of the ammonium salt employed for the treatment, of less than about 1% by weight. In case the anion of the ammonium salt used is formate, carbonate, acetate, nitrate or mixtures thereof, the anionic impurity content of the thermally stable active alumina shapes is less than about 0.1% by weight. The thermally stable active alumina shapes are further characterized by a low shrinkage value after a 24-hour exposure to 980°C, coupled with high strength and a capability of retaining a significant portion of the active surface area even after the 24-hour exposure to 980°C.

The thermally stable active alumina shapes of the instant invention when produced from chi-rho-eta type spheres are characterized by the following physical and chemical characteristics as shown in Table I below.

Table I

| Properties of thermally stable active alumina shapes (spheres) made from chi-rho-eta starting material after activation at 900°–950°C for 1 hour | |
|---|---|
| Anionic impurity content in % by weight | ≤0.1 |
| Cationic impurity content in % by weight | <1.0 |
| Surface area (BET) in m²/g | >60 |
| *Abrasion loss in % | <0.1 |
| **Crushing strength (average) in kg | >9 |
| Bulk density in kg/m³ | 700–770 |

*Abrasion Loss (%) A weighed amount of spheroids (av. diameter 3.2 mm) were tapped on a RO-TAP machine for 30 minutes. The material was then screened and the material passing through the screen (0.595 mm. openings) was weighed and recorded as abrasion loss.
**Crushing Strength A sample of spheroids having an average diameter of 3.2 mm was placed on a screen having openings of 3.36 mm and 25 spheroids retained in the openings of the screen were removed for testing while both the undersized and oversized spheroids were discarded. Each of the 25 spheroids was placed in a "Chatillon Model HTCM" Crushing Strength Tester operated at a speed of 3. The crushing strength was determined by reading the pressure in kg required to crush the spheroid. The results for the 25 spheroids were averaged and reported as "crushing strength in kg".

The test methods described hereinabove were employed to measure the abrasion loss and crushing strength values reported hereinafter.

To show the high degree of thermal stability of the thermally stable active alumina spheres, characterized in Table I, the spheres (approximately 3.2 mm in diameter) were exposed to 980°C for 24 hours. The properties of these thermally treated spheres are shown in Table II.

Table II

| Properties of thermally stable active alumina spheres after exposure to 1000°C for 24 hours | |
|---|---|
| Crushing strength in kg. (average) | >7 |
| Shrinkage in % | <4 |
| Surface area (BET) in m²/g | >40 |

In comparison, untreated alumina spheres (starting material), when subjected to a thermal treatment at 980° for 24 hours, lost their strength rapidly, resulting in a crushing strength of only 2.8 kg (average) which corresponds to more than a two-thirds reduction in strength coupled with significant reduction in activity.

By employing the novel process of the present invention, it becomes possible to impart thermal stability to shapes made from pseudoboehmitic alumina. Thus, when pseudoboehmite spheres are treated with an ammonium salt in an aqueous medium under steam pressure, followed by leaching and thermal activation, the produced spheres exhibit significantly improved thermal stability even under conditions which involve a 24 hour exposure to 980°C. Table III indicates the significantly improved thermal stability attainable by subjecting pseudoboehmite shapes to the instant process.

Table III

| Properties | (a) | (b) | (c) |
|---|---|---|---|
| Surface area (BET) in m²/g | >150 | >150 | 150 |
| Abrasion loss in % | — | <0.1 | 0.4 |
| Crushing strength in kg | >5.5 | >7.0 | <5.0 |
| Phase | delta (major) | — | — |
| Anionic impurity level in % | <1.0 | — | — |
| Shrinkage % | — | <4.0 | <4.0 |

Table III-continued

| Properties | (a) | (b) | (c) |
|---|---|---|---|
| Cationic impurity level in % | <0.01 | — | — |

(a) Commercially available pseudoboehmitic spheres treated in accordance with the invention;
(b) Thermal treatment of the spheres of (a) at 980°C for 24 hours.
(c) Untreated commercially available pseudoboehmitic spheres subjected to a thermal treatment at 980°C for 24 hours.

Thus, it can be clearly observed that the process of the instant invention produces a thermally stable active alumina product which, even when subjected to high temperatures for extended time periods, is capable of performing without significant loss of surface area and strength. This property of the thermally stable active alumina permits its use as a catalyst carrier where high temperatures are employed or in processes where occasional upward temperature excursions occur, for example in auto exhaust conversion catalyst applications.

The following examples will further illustrate the novel aspects of the instant invention.

EXAMPLE I

A quantity of 45 kg alumina spheres (commercially sold under the trademark A-201 by Kaiser Chemicals) having a predominantly chi-rho-eta structure and having the properties shown in Table IV, were dipped for 1 hour in an aqueous ammonium sulfate solution containing 3% by weight $(NH_4)_2SO_4$ (corresponding to about 0.8% by weight $NH_4^+$).

Table IV

| Properties of alumina starting material | |
|---|---|
| Crystalline phase by X-ray diffraction | chi-rho-eta major |
| Shape | spheres av. 3.2 mm diameter |
| Cationic impurity content (Na) in % | 0.6 |
| Anionic impurity content in % | <0.1 |
| Surface area (BET) m²/g | 300 |
| Abrasion loss in % | <1.0 |
| Crushing strength in kg | >9 |
| Bulk density kg/m³ | 737–770 |

After the 1 hour dipping, the shapes were removed and placed on a metal screen and allowed to drain for approximately 30 minutes. The drained shapes, while still in wet condition were placed in an autoclave and then heated to about 150°C and kept at this temperature for about 16 hours. Subsequently, 10 volumes of water adjusted to pH 9 were added to the autoclave and the spheres were allowed to leach for 1 hour at 95°C. The leach water was then removed by decantation and the leached spheres were dried and then activated in a furnace by keeping the spheres at about 425° for 1 hour, followed by heating of the spheres for 1 hour at about 915°C to obtain the thermally suitable active alumina shapes. The properties of the produced shapes are shown in Table V.

Table V

| Properties of the produced thermally stable active alumina shapes | |
|---|---|
| Anionic impurity level $(SO_4^-)$ in % | 0.64 |
| Cationic impurity level (Na) in % | 0.01 |
| Surface Area (BET) in m²/g | 85 |
| Crushing strength (average) in kg | 9.5 |
| Abrasion loss in % | <0.1 |
| Bulk density in kg/m³ | 760 |
| Crystalline phase | delta (major) |

To test the thermal stability of the active alumina spheres made, the spheres were heated to 980°C for 24 hours and the pertinent properties of the thus treated spheres were measured. The results are shown in Table VI.

Table VI

| Properties of thermally stable active alumina shapes treated at 980°C for 24 hours | |
|---|---|
| Surface area (BET) in m²/g | 46 |
| Crushing strength (average) in kg | 8.1 |
| Shrinkage in % | 2.9 |

EXAMPLE II

The process of Example I was repeated using a mixture of ammonium acetate and ammonium sulfate as the treating agent at an NH₄OAc concentration of 6.5% and an $(NH_4)_2SO_4$ concentration of 1.4%. The dipped shapes were autoclaved at 150°C for 16 hours, then leached with water for 1 hour at 95°C, and subsequently dried, followed by thermal activation in two stages, wherein the first stage proceeded at about 430°C for 1 hour, with a subsequent heat-treatment at about 920°C for 1 hour. The properties of the obtained thermally stable active alumina shapes are shown in Table VII. A portion of the thermally stable active alumina spheres was heated to 980°C for 24 hours. The results obtained after this heating are reported in Table VIII.

Table VII

| Properties of the produced thermally stable active alumina shapes | |
|---|---|
| Anionic impurity level $(SO_4^-)$ in % | 0.36 |
| Cationic impurity level (Na) in % | 0.04 |
| Surface Area (BET) in m²/g | 71 |
| Crushing strength in kg | 9.5 |
| Abrasion loss in % | <0.1% |
| Bulk density in kg/m³ | 750 |
| Crystalline phase | delta (major) |

Table VIII

| Properties of thermally stable active alumina shapes treated at 980°C for 24 hours | |
|---|---|
| Surface area (BET) in m²/g | 43 |
| Crushing strength in kg | 8.6 |
| Shrinkage in % | 3.1 |

EXAMPLE III

The preparation of thermally stable active alumina spheres was repeated using the process shown in Example I. As the $NH_4^+$-containing treating agent, an ammonium bicarbonate solution containing about 6.2% by weight $NH_4^+$ was employed. The spheres were autoclaved at 115°C for 32 hours, followed by leaching with hot water and thermal activation as shown in Example I. The thermally stable active alumina shapes obtained were characterized by their properties and the results are shown in Table IX. Also, a portion of the spheres was treated for 24 hours at 980°C to test the extent of thermal stability. The results of this heat-treatment are shown in Table X.

EXAMPLE IV

To compare the instant process with prior art processes using strong acids, the starting material of Example I was treated with aqueous sulfuric acid solution containing 1.2% by weight $H_2SO_4$, followed by draining, autoclaving at 140°C for 16 hours and drying. The dried shapes were then activated in two stages as shown in Example I. The acid-treated activated shapes were then tested and the properties obtained by the tests are compiled in Table XI. To test the thermal stabilty of the acid-treated activated alumina, the samples obtained were subjected to a 24-hour heat-treatment at 980°C. The results are reported in Table XII.

Table IX

| Properties of the produced thermally stable active alumina shapes | |
|---|---|
| Anionic impurity level ($CO_3^-$) in % | <0.1 |
| Cationic impurity level (Na) in % | 0.02 |
| Surface Area (BET) in $m^2/g$ | 101 |
| Crushing strength in kg | 13.5 |
| Abrasion loss in % | <0.1 |
| Bulk density in $kg/m^3$ | 730 |
| Crystalline phase | delta (major) |

Table X

| Properties of thermally stable active alumina shapes treated at 980°C for 24 hours | |
|---|---|
| Surface area (BET) in $m^2/g$ | 56 |
| Crushing strength in kg | 8.4 |
| Shrinkage in % | 2.1 |

Table XI

| Properties of the acid treated active alumina shapes (prior art) | |
|---|---|
| Anionic impurity level ($SO_4^-$) in % | 1.06 |
| Cationic impurity level (Na) in % | 0.44 |
| Surface Area (BET) in $m^2/g$ | 78 |
| Crushing strength in kg | 7.5 |
| Abrasion loss in % | <0.1 |
| Bulk density in $kg/m^3$ | 770 |

Table XII

| Properties of the acid treated active alumina shapes after a 24-hour heat-treatment at 980°C | |
|---|---|
| Surface Area (BET) in $m^2/g$ | 45 |
| Crushing strength (average) in kg | 5.6 |
| Shrinkage in % | 1.9 |

EXAMPLE V

A quantity of commercially available pseudoboehmite spheres, (sold by Kaiser Chemicals under the designation of Substrate Alumina - sas) having an average diameter of approximately 3.2 mm, was immersed for 1 hour in a 3% $(NH_4)_2SO_4$ solution, then drained and placed in an autoclave. The spheres were kept in the autoclave for 16 hours at 150°C, then were leached with water followed by drying at 200°C for 60 minutes. The dried spheres were then activated at 950°C for 1 hour. A portion of the spheres was subjected to a thermal treatment at 980°C for 24 hours. Results obtained are shown in Table XIII.

Table XIII

| Properties | (a) | (b) |
|---|---|---|
| Surface area in $m^2/g$ | 206 | 167 |
| Crush strength in kg | 6 | 6.7 |
| Anionic impurity level in % ($SO_4^-$) | 0.5 | — |
| Cationic impurity level (Na) in % | 0.01 | — |
| Bulk density in $kg/m^3$ | 500–550 | — |
| Shrinkage in % | — | 4.0 |
| Abrasion loss in % | — | <0.1 |

(a) Pseudoboehmite spheres treated with $(NH_4)_2SO_4$ according to the novel process.
(b) Thermal treatment of treated spheres at 980°C for 24 hours.

From the results described above, it can be observed that the process of the instant invention results in an active alumina which exhibits exceptionally high thermal stability, together with high purity, which properties render the alumina particularly suitable for chemical processes requiring these characteristics.

What is claimed is:

1. A process for producing shaped high purity, thermally stable active alumina catalyst carriers which comprises:
    a. treating alumina shapes, having a crystalline phase structure selected from the group consisting essentially of chi-rho-eta, pseudoboehmite and mixtures thereof, in an aqueous medium with an ammonium salt having a pH in aqueous solution within the range of 4–9,
    b. subjecting the treated shapes to a pressure treatment at a temperature within the range of about 100°C and about 250°C for a time period of about 4 to about 36 hours,
    c. leaching the pressure-treated shapes with water at a temperature from about 20°C to about 100°C,
    d. drying the leached shapes and then subjecting the dried shapes to a thermal activation step within the temperature range from about 500°C to about 980°C for a time period from about 30 minutes to about 100 minutes.

2. Process according to claim 1, wherein the ammonium salt is selected from the group consisting essentially of ammonium acetate, ammonium bicarbonate, ammonium carbonate, ammonium chloride, ammonium formate, ammonium nitrate, ammonium sulfate and mixtures thereof.

3. Process according to claim 1, wherein the pressure treatment is accomplished at a temperature within the range of about 115°C and about 200°C.

4. Process according to claim 1, wherein the ammonium salt concentration in the aqueous medium is from about 0.5% to about 7% by weight calculated on the $NH_4^+$ content of the solution.

5. Process according to claim 1, wherein the treatment of the shapes with the ammonia salt is accomplished simultaneously with the pressure treatment.

6. Process according to claim 1, wherein the alumina shape to be treated has a chi-rho-eta crystalline phase structure.

7. Process according to claim 1, wherein the alumina shape to be treated has a pseudoboehmite crystalline phase structure.

8. Process according to claim 2 wherein the ammonium salt is ammonium sulfate.

9. Process according to claim 2, wherein the ammonium salt is ammonium acetate.

10. Process according to claim 2, wherein the ammonium salt is a mixture of ammonium acetate and ammonium sulfate.

11. A high purity, shaped thermally stable active alumina catalyst carrier produced by treating alumina shapes, having a crystalline phase structure selected from the group consisting essentially chi-rho-eta, pseudoboehmite and mixtures thereof, with an ammonium salt in an aqueous medium, the ammonium salt having a pH in aqueous solution within the range of 4 to 9; subjecting the treated shapes to a pressure treatment for a period of about 4 to about 36 hours at a temperature within the range of about 100°C and about 250°C, followed by leaching of the pressure-treated shapes with water and subsequent drying within the temperature range of about 100°C and about 200°C and thermal activation of the dried shapes within the temperature range of about 500°C and about 980°C; the thermally activated shapes being characterized by a delta crystalline structure, an anionic impurity level of less than about 1% by weight, a cationic impurity level of less than about 0.1% by weight, a crushing strength of at least about 6 kg when applied to spherical shapes having an average diameter of about 3.2 mm and an abrasion loss below about 0.1%.

* * * * *